Oct. 12, 1948.    H. T. JARVIS    2,451,289
IGNITION CONTROL
Filed June 25, 1945    2 Sheets-Sheet 1
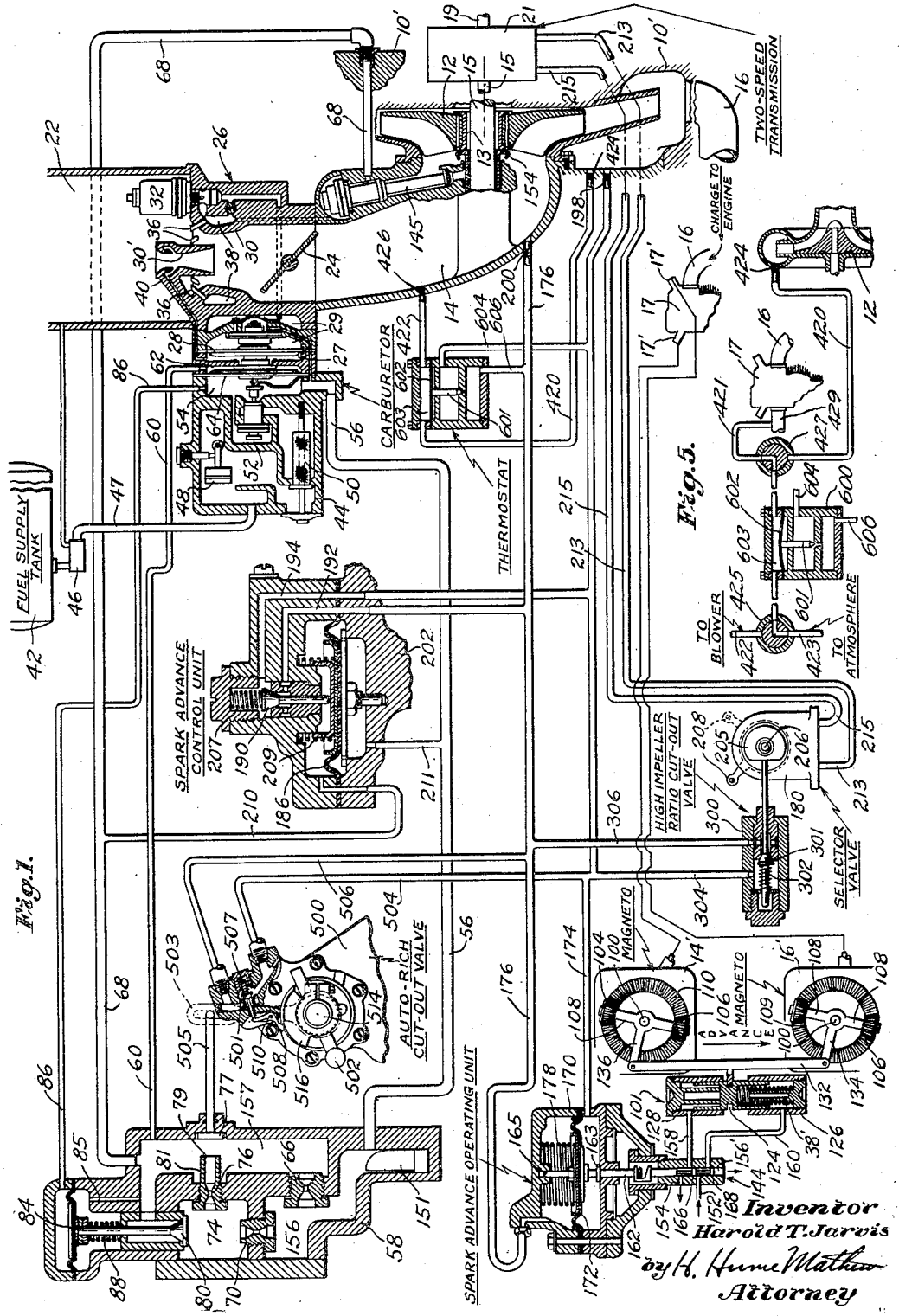

Oct. 12, 1948.　　　　　H. T. JARVIS　　　　　2,451,289
IGNITION CONTROL
Filed June 25, 1945　　　　　　　　　　　　　2 Sheets-Sheet 2
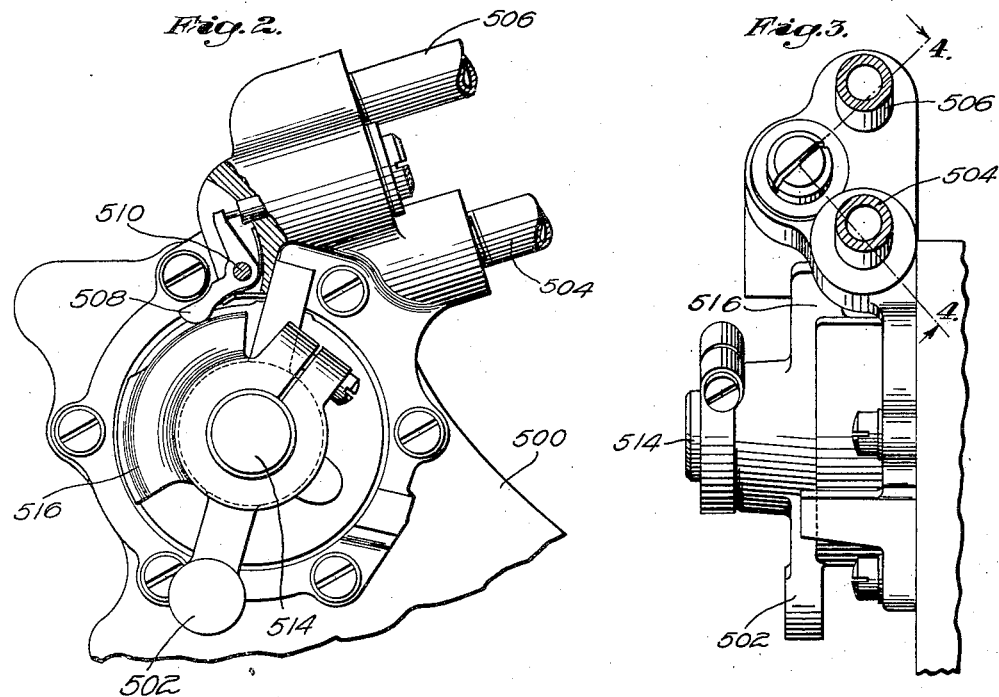
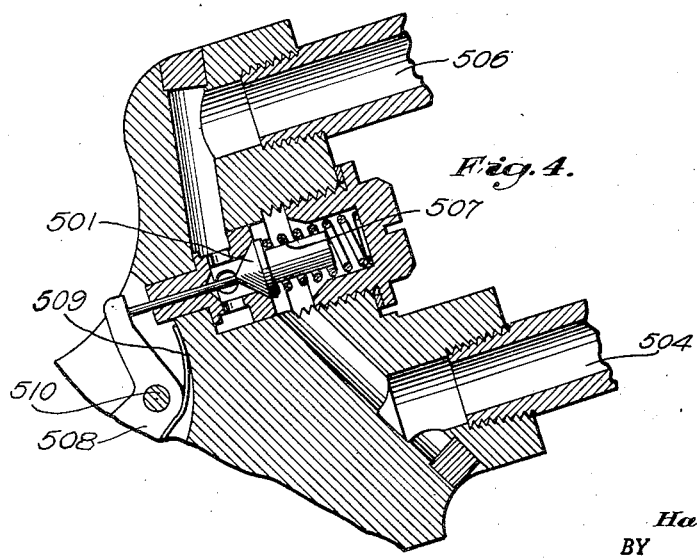
INVENTOR.
Harold T. Jarvis
BY
H. Hume Mathews
Attorney Patented Oct. 12, 1948

2,451,289

UNITED STATES PATENT OFFICE 2,451,289

IGNITION CONTROL

Harold T. Jarvis, Manchester, Conn., assignor to United Aircraft Corporation, East Hartford, Conn., a corporation of Delaware Application June 25, 1945, Serial No. 601,436

14 Claims. (Cl. 123—117)

This invention relates to the control of ignition systems for engines, particularly aircraft engines. This application is a continuation-in-part of co-pending Jarvis application Serial No. 481,114, filed March 30, 1943, now Patent No. 2,380,967, assigned to applicant's assignee.

An object of this invention is to provide improved means for controlling the ignition timing system of an engine.

Another object is to provide means for regulating the operation of an automatic ignition timing system for engines in accordance with changes in combustion characteristics of the engine charge resulting from the operation of engine controls such as a mixture strength regulating device and a supercharger speed setting mechanism, or in accordance with changes in an engine operating condition such as charge inlet temperature or exhaust gas temperature.

A further object is to provide improvements in control devices for internal combustion aircraft engines.

Other objects and advantages will be apparent from the specification and claims and from the accompanying drawings which illustrate what is now considered to be a preferred embodiment of the invention.

In the drawings, Fig. 1 is a schematic view showing an ignition timing apparatus incorporating control devices constructed and arranged according to the teaching of this invention.

Fig. 2 is an enlarged partial front view of the auto-rich cut-out valve of Fig. 1.

Fig. 3 is a side view of the valve of Fig. 2.

Fig. 4 is a partial sectional view along the lines 4—4 of Fig. 3.

Fig. 5 is a diagrammatic view showing a modification in the arrangement of the thermostatic cut-out valve of Fig. 1.

The embodiment of the invention shown in the drawings is particularly adapted for use with aircraft engines having engine driven superchargers, preferably of the two-speed gear driven type, but it is to be understood that the invention is not limited to such use.

According to this invention an automatic spark advance mechanism for an internal combustion engine may be controlled in a simple and dependable manner in accordance with changes in engine operating conditions such as mixture strength, supercharger gear ratio, charge inlet temperature and exhaust gas temperature.

Referring to the embodiment of the invention selected for illustration in the drawings, a radial aircraft engine having air-cooled cylinders, one of which is shown at 17, is supplied with charging fluid (air or air and fuel) through induction pipes, one of which is shown at 16, by a main stage supercharger impeller 12 mounted in a supercharger or blower case, a portion of which is shown at 10'. The impeller is splined at 13 to a shaft 15 driven in a known manner by the engine crankshaft 19 through a two-speed gear train or transmission diagrammatically shown at 21, which may, for instance, be similar to those disclosed and claimed in Hobbs Patent No. 2,323,601, dated July 6, 1943 and in Hobbs-Willgoos application, Serial No. 492,423, filed June 26, 1943, now Patent No. 2,400,307, assigned to applicant's assignee.

Intake air is supplied to the supercharger inlet or throat 14 by a manifold 22 connected either directly to a scoop or ram positioned in the free airstream flowing over the aircraft or to the outlet of an auxiliary supercharger stage. The rate of flow by weight of intake air, and therefore engine power output, is controlled by throttle 24.

The engine fuel system includes a carburetor metering section 26 comprising a main venturi 30, auxiliary venturi 30' and impact tubes 36, which cooperate to produce throat and scoop pressures in chambers 40 and 38, respectively. The pressure differential between the chambers varies with, and is a measure of, engine intake airflow.

These throat and scoop pressures, as corrected for variations in density by altitude compensator 32, are admitted to chambers 27, 29 on opposite sides of air diaphragm 28. The resultant force exerted by the diaphragm on fuel flow regulating valve 52 is a function of the rate of flow by weight of intake air and urges the valve toward open position.

Fuel is supplied to valve 52 by pump 46 from tank 42 through line 47 and strainer 50. A vapor trap including float valve 48 may be provided to eliminate gases from the liquid fuel, which is preferably gasoline.

Fuel in an amount controlled by valve 52 flows through unmetered fuel chamber 54 and line 56 to the fuel control body or metering jet section 58. After being metered in control body 58, the fuel passes through the metered fuel line 68 to the fuel discharge valve 145 and then into the fuel spinner 154 which sprays it into the air entering the vaned passages of impeller 12.

A fuel diaphragm 64 separates the unmetered fuel chamber 54 from a chamber 62, subjected by line 60 to the metered fuel pressure on the downstream side of the metering jets in the control 58. The resultant force exerted by this diaphragm on fuel valve 52 is dependent upon the fuel pressure drop across the metering jets, and urges the valve toward closed position. Fuel and air diaphragms 64, 28 and fuel valve 52 act to maintain a pressure drop across the metering jets between the unmetered and metered lines 56, 68 which is proportional to the compensated air pressure drop between the throat chamber 40 and the scoop chamber 38, thus regulating the rate of flow by weight of fuel to the engine in predetermined ratio to the rate of flow by weight of engine intake air, throughout the engine operating range.

This fuel-air ratio may be varied by controlling the jets in the fuel control body 58. The basic fuel-air ratio throughout the engine operating range is established by the main or cruise jet 66, which is continuously open. In addition to the flow through this jet, fuel may also flow from the unmetered jet chamber 156 through the economizer jet 70 into the chamber 74 and then through the auto-rich jet 76 into the metered jet chamber 157, when the auto-rich valve 77 is open as shown in Fig. 1. Jet 76 has a greater restriction than jet 70. Therefore, assuming valve 80 to be closed, the mixture is enriched by an amount determined substantially by the size of jet 76 when valve 77 is open.

It is desirable under high engine power output conditions to provide additional enrichment or higher mixture strengths to prevent detonation, and for other purposes. This is accomplished by economizer valve 80 operated by diaphragm 84 subjected to metered fuel pressure through passage 85 and unmetered fuel pressure through line 86. When the fuel pressure drop becomes sufficiently high, valve 80 is opened against the force of spring 88 to provide additional fuel in an amount determined by the value of the fuel pressure drop, the rate of spring 88 and the contour of valve 80, up to a maximum quantity determined by the size of economizer jet 70, which imposes a limit on the maximum flow permitted through both valve 80 and jet 76. Fuel enrichment occurs regardless of whether or not the carburetor is in the auto-rich position in which valve 77 is open, or in the auto-lean position in which valve 77 closes the opening 79 and thereby shuts off the flow of fuel through jets 76.

Idle valve 151, linked in a known manner with the throttle 24, is moved to a metering position, in which it restricts the flow from the end of unmetered fuel line 56 and thereby controls the mixture strength, when the throttle is closed and the engine is idling. When the throttle is open, idle valve 151 has no appreciable effect on the mixture strength.

For a more detailed disclosure of the above described fuel control apparatus, reference is made to Palmer application, Serial No. 529,104, filed April 1, 1944, assigned to applicant's assignee.

The engine ignition system comprises magnetos 14', 16' which supply ignition current at timed intervals to spark plugs 17' of the engine cylinders 17. The magnetos are driven from the engine crankshaft by gear trains including magneto drive gears 109, 110 in a manner more fully disclosed in the Jarvis application referred to above and to which reference is made for a more complete disclosure of the basic ignition system referred to herein.

For changing the timing of the magnetos, or the time at which ignition current is supplied to the spark plugs with respect to piston position, the magneto gear trains are each provided with bevel idler gears 104, 106, mounted on cages 108 rotatably supported on the magneto shafts 100, to which gears 109, 110 are fixed. Cages 108 are connected by arms 134, 136 to a cross bar or link 132 attached to the piston 124 of a servo motor 101. When pressure fluid such as oil is admitted to one or the other of cylinders 126, 128 of the servo motor the piston 124 will be reciprocated to move link 132 and retard or advance the ignition timing. A spring 38' biases piston 124 to retard position.

Servo motor 101 is controlled by a spark advance operating unit 144 including a servo valve 162 having lands 166, 168 which control the admittance of oil under pressure from the supply line 152 to the lines 158, 160 respectively attached to cylinders 128, 126. Drains 154, 156' are provided for relieving pressure in one cylinder as pressure fluid is admitted to the other.

Valve 162 is actuated by diaphragm 172 subjected to the pressure difference between fluid lines 174, 176, which are respectively connected through restriction 198 to the blower outlet and through restriction 200 to the blower inlet. Thus the chamber portion 170 of the spark advance operating unit is divided by diaphragm 172 into two fluid tight chambers connected to blower throat and blower rim.

A spring 178 maintains valve 162 in its downward or retard position, determined by the stop 163. When the force exerted by the fluid pressures on diaphragm 172 is sufficient to overcome the force of spring 178, valve 162 is moved upwardly to its advance position, determined by the abutment of the stop 165 against chamber 170.

According to this invention, it has been found desirable to maintain the spark retarded under certain engine operating conditions even though the supercharger pressure rise is sufficiently high to hold valve 162 in its upper or advance position. For this purpose by-pass valves 190, 301, 501 and 601 are provided. When any one of these valves is opened, the effect is to bleed or by-pass air from the blower rim line 174 to the blower throat line 176. Restrictions 198, 200 are made of such value in relation to the size of valves 190, 301, 501 and 601 that the opening of any one of these valves will approximately equalize the pressure in lines 174, 176, thereby causing the pressures on opposite sides of the diaphragm in chamber 170 to become substantially equalized and enabling spring 178 to maintain or return valve 162 to the retard position.

By-pass valve 190 of the spark advance control unit 202 is controlled by a fuel head diaphragm 186 subjected to unmetered fuel pressure by line 211 and to metered fuel pressure by line 210. Thus the force exerted by diaphragm 186 on valve 190 is determined by the fuel pressure drop which is in turn determined by the rate of flow by weight of engine intake air. Consequently diaphragm 186 will open valve 190 against the force of diaphragm spring 209 and valve spring 207 when intake airflow (and engine power output) reaches a predetermined value.

By-pass valve 301 in the high blower cut-out 300 is opened or closed by a cam 205 on the selector valve shaft 206 in the selector valve 180. Shaft 206 is actuated by an operating handle 208 and controls the valve 180 so as to regulate the application of pressure fluid through lines 213, 215 to speed ratio varying means or gear shifting mechanism in the transmission 21 to thereby regulate the gear ratio, or the speed ratio, of the transmission, in a known manner, for instance like that disclosed in the Hobbs patent or the Hobbs-Willgoos application referred to above. When impeller 12 is being driven by the engine in the high transmission ratio, the resultant temperature rise of the air passing through the supercharger is so great that it is desirable to maintain the spark in retarded position, in order to prevent detonation and for other reasons. When the blower is being driven in the low gear ratio this is not necessary. Therefore cut-out 300 is so arranged that when shaft 206 and handle 208 are in the low blower position (as shown by the full lines), in which the supercharger drive is placed in low speed ratio, valve 301 is maintained in closed position by the spring 302 and the spark advance unit 144 operates in its normal manner. But when shaft 206 is rotated to its alternative or high blower position (corresponding to the dotted line position of handle 208) in which the supercharger drive is placed in the high speed ratio, the cam 205 forces valve 301 to the left against the force of spring 302, establishing a bleed between the rim and throat lines 174, 176 by way of passages 304, 306. Thus when valve shaft 206 and handle 208 are in the high impeller ratio position, valve 301 will be opened and the operating unit 144 will be maintained in the spark retard position regardless of the value of the supercharger pressure rise.

By-pass valve 501 in the mixture control 500 (best shown in Figs. 2, 3 and 4) is actuated by handle 502. When the handle is moved to change the mixture setting of the carburetor, shaft 514, fixed thereto, is rotated to angularly adjust yoke 503 (Fig. 1) connected to valve lever 505, thereby shifting valve 77 to close or open the port 79. Movement of shaft 514 also angularly shifts a cam 516, keyed to the shaft, to close or open bleed valve 501 against the force of spring 507 by means of bell crank 508, fulcrumed at 510. A spring 509 may be provided to hold the bell crank in contact with the cam. The levers and cam are so arranged that whenever handle 502 is in the auto-rich position valves 77 and 501 are both open and when the handle is in auto-lean position valves 77 and 501 are both closed. A bleed or by-pass is established between lines 174, 176 through pipes 504, 506 when valve 501 is open.

By-pass valve 601 in the thermostatic cut-out 600 is operated in response to variations in the temperature of the engine charge after it has been compressed by the supercharger. A small amount of charging fluid is continuously circulated through the chamber 603 of the valve unit 600 by conduits 420, 422. These conduits contain restrictions 424, 426 for limiting such flow to a low rate, sufficient merely to maintain the temperature in chamber 603 approximately the same as the temperature of the charging fluid at the blower rim. A thermostatic strip or disc 602 (preferably of the snap acting type) is exposed to the fluid passing through chamber 603 and is connected to the valve 601 so as to lift the valve and open a by-pass between the lines 174, 176 by way of passages 604, 606 at a predetermined value of the temperature of the fluid in chamber 603. Valve 601 is held closed by the inherent resiliency of the bimetallic element 602 when the temperature in chamber 603 is below said predetermined value. The valve unit 600 therefore operates to equalize the pressures in lines 174, 176 to insure retarded spark position whenever the engine charge temperature exceeds a predetermined value. For charge temperatures below such predetermined value, by-pass valve 601 will be closed and the operation of the spark advance mechanism will not be affected by the thermostatic unit 600.

Fig. 5 shows a modification in the arrangement of thermostatic cut-out 600. In this figure the chamber 603 and thermostatic element 602 may be subjected to exhaust gas temperature by conduit 421 connected to an engine cylinder exhaust pipe 429, when valves 425, 427 are in the position shown. The exhaust gas passing through chamber 603 may be bled to atmosphere by conduit 423. The valve unit will then be responsive to engine exhaust gas temperature and will equalize the pressures in lines 174, 176 when this temperature exceeds a predetermined value. If desired, the cut-out 600 may be connected with two way valves, as shown in Fig. 5, which may be rotated to connect the chamber 603 alternatively to either the exhaust pipe 429 and atmosphere or to the supercharger rim and throat lines 420, 422.

*Operation*

The spark advance operating unit 144 will be actuated by the pressure rise across the supercharger to advance the ignition timing at a predetermined value of the pressure rise. Because the pressure rise varies with intake airflow (and engine power output) this advance in ignition timing may be made to occur when the engine power output enters the cruising power range, thereby providing retarded spark for idling conditions and advanced spark for cruising conditions.

As engine power output is further increased valve 190 in the cut-out 202 is opened at a predetermined rate of intake airflow to provide retarded spark under high power output conditions, for power outputs above the cruising range.

Regardless of the value of the supercharger pressure rise, or the position of airflow cut-out valve 190, the rich mixture cut-out 500 will maintain the spark in retarded position whenever the engine is operated under auto-rich mixture conditions, with relatively high fuel-air ratios.

Similarly, the cut-out 300 will insure retarded spark whenever impeller 12 is being driven in high transmission ratio, at relatively high speed relative to the speed of the engine crankshaft; and the cut-out 600 will insure retarded spark whenever the charge inlet temperature (or exhaust gas temperature) exceeds a predetermined value.

An advantage of the high blower cut-out 300 is that it enables the airflow control unit 202 to be constructed or adjusted so as to open and retard the spark at a higher value of intake airflow than would be permissible if the high blower cut-out were not provided. In other words, the cut-out 300 enables the ignition system to be arranged so as to maintain the spark in advanced position (thereby providing economical operation from the standpoint of fuel consumption) to a relatively high power output in low blower, yet it insures safe and dependable operation by maintaining the spark retarded in high blower.

A similar advantage is provided by the temperature cut-out 600; when the charge temperature is sufficiently low, spark advanced operation may be extended by the control 202 to relatively high powers, yet when the charge temperature is too high, the spark is automatically retarded.

The rich mixture or auto-rich setting of valve 500 is particularly suitable for operation in take-off or climb or under unfavorable cooling conditions. The cut-out 501 insures a retarded spark under such conditions, thus improving engine cooling conditions and enabling the control 202 to be set for a higher airflow shift point than would otherwise be possible.

It is to be understood that the invention is not limited to the specific embodiment herein illustrated and described, but may be used in other ways without departure from its spirit as defined by the following claims.

I claim:

1. In an aircraft engine having an adjustable ignition timing system, timing means for automatically advancing and retarding the ignition timing in accordance with variations in engine power output, and means for rendering said timing means operative or inoperative to advance the timing in accordance with changes in the condition of the engine charging fluid and independently of variations in said engine power output.

2. In an internal combustion engine having an adjustable ignition timing mechanism, timing means for adjusting said mechanism to advance the ignition timing within a predetermined portion of the engine power range and to retard said timing within a different predetermined portion of the engine power range, and means for overriding said timing means to maintain said timing retarded in both said portions of the engine power range in response to a predetermined change in the combustion characteristics of the engine charging fluid.

3. In an ignition system for an engine having a manually actuated charge mixture strength control device, means for automatically varying the timing of said ignition system, and means connected with said mixture control device for rendering said timing varying means effective or ineffective to change said timing.

4. In an ignition system for an engine having a supercharger and a multi-speed ratio transmission for driving said supercharger, a device for changing the speed ratio of said transmission, means for automatically varying the timing of said ignition system, and means connected with said transmission ratio control device for rendering said timing varying means effective or ineffective to change said timing.

5. In an ignition system for an engine having a charge inlet passage, means for automatically varying the timing of said ignition system, and means responsive to variations in the temperature of engine charging fluid in said inlet passage for rendering said timing varying means effective or ineffective to change said timing.

6. In an ignition system for an engine having an exhaust gas passage, means for automatically varying the timing of said ignition system, and means responsive to variations in the temperature of engine exhaust gas in said passage for rendering said timing varying means effective or ineffective to change said timing.

7. An ignition timing apparatus for an aircraft engine having a supercharger and having a mixture strength control device provided with auto-lean and auto-rich settings for relatively lean and relatively rich charge mixture strengths, comprising an operating unit responsive to the fluid pressure differential across said supercharger for advancing the ignition timing, a control unit responsive to engine intake airflow for modifying the effect of said pressure differential on said operating unit, and a cut-out valve actuated by said mixture strength control device for modifying the effect of said pressure differential on said operating unit when said device is in said auto-rich setting.

8. The apparatus of claim 7, including a supercharger speed control device having high and low settings for providing relatively high and relatively low speeds for said supercharger, and a cut-out valve actuated by said supercharger speed control device for modifying the effect of said pressure differential on said operating unit when said device is in said high speed setting.

9. The apparatus of claim 7, including a fluid passage connected to a combustion chamber for said engine, and a cut-out valve responsive to the temperature of a fluid in said passage for modifying the effect of said pressure differential on said operating unit when said temperature is above a predetermined value.

10. In an ignition timing apparatus for an engine having a fuel-air ratio control for establishing lean or rich mixture strength conditions, means effective when said control establishes lean mixture strength conditions for first advancing and then retarding the engine ignition timing as engine power output continuously increases, and means for maintaining the ignition timing retarded regardless of variations in engine power when said control establishes rich mixture strength conditions.

11. In an ignition timing apparatus for an engine having a supercharger which is driven at different speeds during engine operation, means actuated in accordance with predetermined changes in the speed of said supercharger for rendering said timing apparatus effective or ineffective to change the ignition timing of said engine.

12. In an aircraft engine, a supercharger, means for driving said supercharger by said engine in at least two different speed ratios, an ignition timing apparatus for said engine including a by-pass valve, and means for maintaining said valve open when said supercharger is being driven in one of said speed ratios and for maintaining said valve closed when said supercharger is being driven in the other of said speed ratios.

13. In an aircraft engine having a pressure injection type carburetor including a mixture strength control, an ignition timing apparatus for automatically varying the ignition timing of said engine in accordance with changes in an engine operating condition, and means operatively associated with said mixture control for regulating the operation of said ignition timing apparatus.

14. In an aircraft engine having a supercharger, an ignition timing apparatus actuated by the pressure rise across said supercharger for automatically varying the ignition timing of said engine in accordance with changes in an engine operating condition, and means responsive to changes in the temperature of the engine exhaust gas for regulating the operation of said ignition timing apparatus.

HAROLD T. JARVIS.

REFERENCES CITED

The following references are of record in the file of this patent:

UNITED STATES PATENTS

| Number | Name | Date |
|---|---|---|
| 2,309,226 | Udale | Jan. 26, 1943 |
| 2,378,037 | Reggio | June 12, 1945 |